United States Patent
Hudgins

(10) Patent No.: US 8,661,678 B1
(45) Date of Patent: Mar. 4, 2014

(54) COMBINATION ROLLER COASTER WHEEL

(75) Inventor: Jeff Hudgins, Valencia, CA (US)

(73) Assignee: Uremet Corporation, Orange, CA (US)

( * ) Notice: Subject to any disclaimer, the term of this patent is extended or adjusted under 35 U.S.C. 154(b) by 411 days.

(21) Appl. No.: 12/706,231

(22) Filed: Feb. 16, 2010

(51) Int. Cl.
*B21D 53/26* (2006.01)
*B21H 1/08* (2006.01)

(52) U.S. Cl.
USPC ............... 29/894.011; 29/894.01; 29/447; 29/557; 295/31.1; 301/11.1

(58) Field of Classification Search
USPC ............ 29/447, 428, 557, 894.01, 894.011; 295/1, 11, 31.1; 301/10.1, 11.1, 15, 16
See application file for complete search history.

(56) References Cited

U.S. PATENT DOCUMENTS

| | | | |
|---|---|---|---|
| 133,336 A * | 11/1872 | Prew | 295/21 |
| 327,095 A * | 9/1885 | Lowrie | 295/1 |
| 331,292 A * | 12/1885 | Ferguson | 295/18 |
| 1,132,213 A * | 3/1915 | Ramsden | 29/894.01 |
| 1,617,152 A | 2/1927 | Gair | |
| 1,648,413 A * | 11/1927 | Maas | 295/11 |
| 1,947,462 A | 2/1934 | Doorbar | |
| 1,963,859 A * | 6/1934 | Micheal | 295/15 |
| 2,188,569 A * | 1/1940 | Endsley | 148/569 |
| 2,558,384 A | 6/1951 | Pritchard | |
| 3,272,550 A * | 9/1966 | Peterson | 295/31.1 |
| 3,612,134 A * | 10/1971 | Mlnarik | 152/9 |
| 4,072,072 A | 2/1978 | Harb | |
| 4,256,348 A * | 3/1981 | Lester et al. | 301/63.103 |
| 4,363,347 A * | 12/1982 | Baumgartner | 152/411 |
| 4,702,673 A * | 10/1987 | Hansen et al. | 416/215 |
| 6,093,266 A * | 7/2000 | Mollee | 148/439 |
| 6,598,919 B2 * | 7/2003 | Bradley et al. | 295/1 |
| 6,746,064 B1 * | 6/2004 | Petrek et al. | 295/1 |
| 7,739,794 B2 * | 6/2010 | Mantkowski | 29/894.01 |
| 2003/0205909 A1 | 11/2003 | Bradley et al. | |
| 2008/0199301 A1* | 8/2008 | Cardarella, Jr. | 415/9 |
| 2009/0218837 A1 | 9/2009 | Mantkowski | |

* cited by examiner

*Primary Examiner* — Alexander P Taousakis
(74) *Attorney, Agent, or Firm* — Fulwider Patton LLP

(57) ABSTRACT

Wear resistant metal ring thermally locked at a machined interface to a lightweight alloy roller coaster wheel body and method of machining and thermally locking.

5 Claims, 5 Drawing Sheets

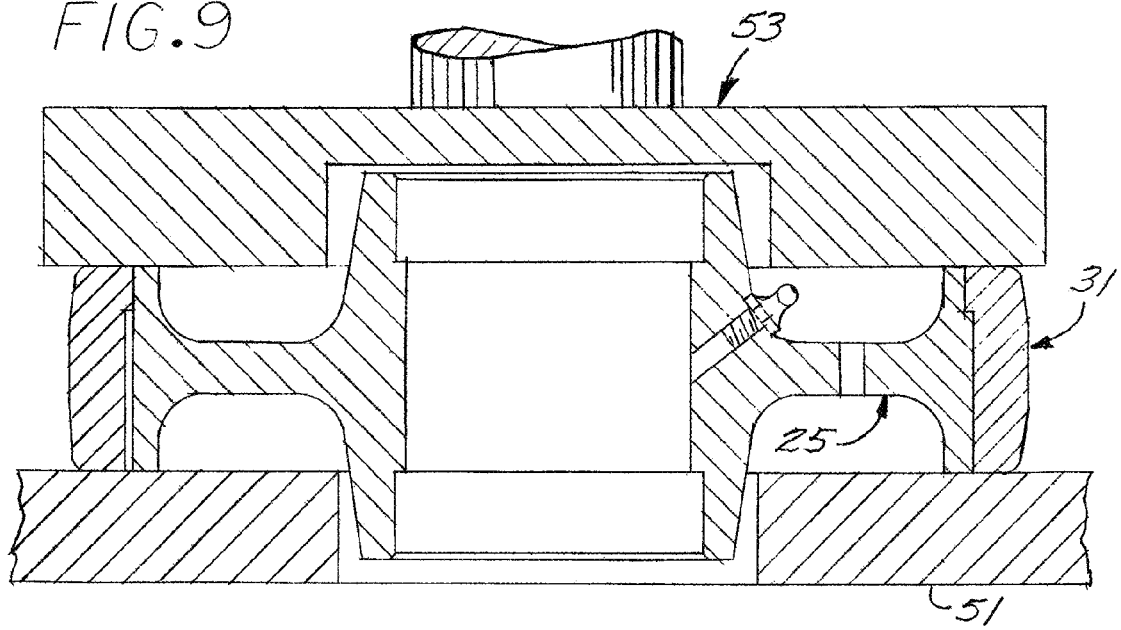
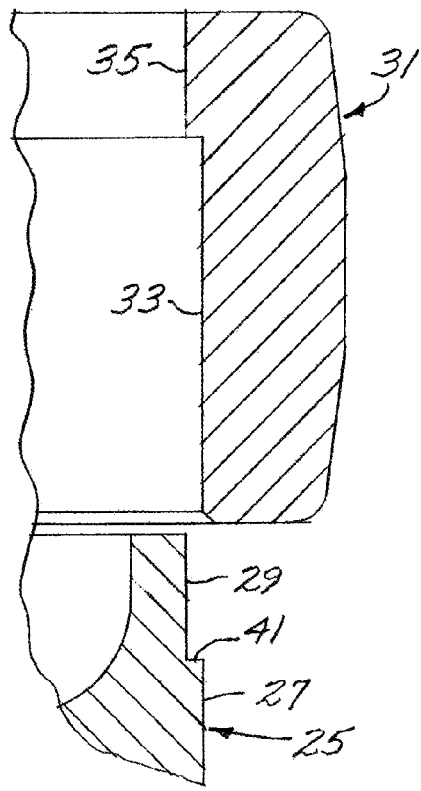
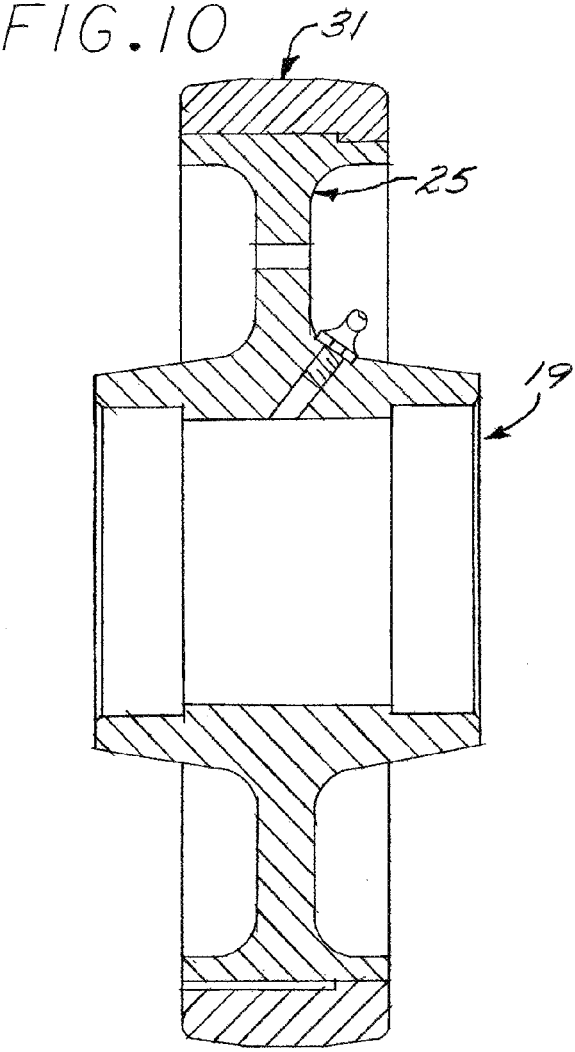

COMBINATION ROLLER COASTER WHEEL

BACKGROUND

1. Field of the Invention

The present invention relates to roller coaster wheels.

2. Description of the Prior Art

Roller coasters have for centuries been a popular form of entertainment and distraction in nearly every developed country, starting in about the 17th century with the ice slides in Russia involving the frame work constructed of the lumber with several inches of thick ice covering the surface so that sliders could speed down the 50° drop. By the mid to late 1700's wheels had been added to roller coaster cars and as design improvements continued, methods where devised for locking the cars unto the tracks and for guiding the cars along the tracks and the application of the brakes for slowing the speed of the car. After some slackening, wooden frame roller coasters have now regained their popularity, growing to over 3,000 feet in length and some 70°-75° and beyond in the first drop with undulations providing for fast to slow and back to fast several times throughout the course with twisting layouts and challenging contours providing for good, violent rides.

Many installations provide trains of cars including multiple wheels on each car which may involve 80 to 100 wheels per roller coaster train. The wheels are subjected to high stresses and strain throughout the maneuvers of the roller coaster trains while they experience changes in angular acceleration as they wind along their paths, through curves, variations in elevation and positive and negative G's, repetitively stressing the wheels and applying high loads thereto. The wheels may have an outside diameter on the order of 4 to 12 inches and the tread surfaces thereof are typically in direct contact with the tracks often making metal to metal contact and experiencing the abrasive effect of dirt or grit captured between the wheels and the tracks and the repetitive pounding of metal on metal which, in spite of shock absorbers sometimes incorporated in the vehicles, tends to shock the wheels and shorten their service lives. Efforts have been made to smooth out track installations in effort to reduce the loads and fatigue on the wheels but this is generally an imperfect construction and maintenance process. It is also been proposed to incorporate plastic tread in the form of urethanes and the like in effort to absorb the shock and extend the life of the wheels but, such treads typically wear relatively rapidly resulting in high maintenance expenses for replacement and repair.

Those working in the art have recognized that steel wheels, while providing structure and integrity, are extremely expensive and little flex or give which might absorb the high impact shock applied to the wheels. In other areas of wheel design, numerous different constructions have been proposed to provide hard, impact resistant tread surfaces. An early examples is wooden or cast wheel bodies having a circular periphery about which was formed a wear and shock resistant tread band. One of the challenges addressed has been the efficient and positive attachment of the band to the wheel in effort to resist shock, separation and wear and tear to provide for a long life. One such solution was to provide a strip of steel to be bent in a circle about the wheel body to bring the opposite ends into confronting spaced relationship exhibiting a small gap so that the band could be heated to provide thermal expansion and closure of the gap for welding or other attachment to hold the band closed so that, upon cooling it would provide a high friction grip to the wheel. A device of this type is shown in U.S. Pat. No. 1,947,462 to Doorbar.

Other multiple component designs have been proposed for model trains to provide for electrical insulation between the tracks and wheel bodies. A device of this type is shown in U.S. Pat. No. 2,558,384 to Pritchard.

In recognition of the short comings of roller coaster wheels with urethane treads which require frequent replacement and maintenance, a split wheel construction has been proposed for sandwiching a rim therebetween for mounting a urethane tire to thereby reduce the labor intensive process of repairing the wheels. A device of this type is shown in U.S. Patent Application No. 2003/0205909 to Bradley.

Large diameter railroad wheels are typically constructed of steel and are relatively expensive to replace. Thus, it has been proposed to, when a railroad wheel become warn or out of round, to machine the exterior surface thereof and, to anodize the surface and apply the steel ring to the machined wheel to thus simulate the flanged exterior diameter of a new wheel. A device of this type is shown in U.S. Patent Application No. 2009/0218837 to Mantkowski.

Aluminum roller coaster wheels have been proposed for both the weight bearing function as well as guiding of roller coaster itself. It has been recognized that, particularly with respect to the guide wheels, the wheels are disengaged from contact with the guide rail and may thus slow down in their rotation or come into a complete stop such that when the fast moving roller coaster carries the non-rotating wheel into contact with a guide rail, high angular acceleration is experienced as well skidding engagement with the rail thus severely limiting the life of the wheel. In effort to reduce the attendant shock and noise it has been proposed to provide the wheels with a tread of plastic. A wheel of this type is shown in U.S. Pat. No. 6,093,266 to Mollee.

Steel wheels remain popular today. It is believed that these steel wheels, because of their geometry and material characteristics, are very effective emitters of high frequency sound and are the source of severe squeal noise, a noise associated with a complex combination of creepage between the wheel and ash track and a mechanism known in the art as "stick-slip". Stick-slip occurs when the process of creepage overcomes the ability of a wheel-rail at the interface to impart rotation at the speed of travel and the wheel ends up sliding relative to the rail or track. The friction between the wheel and rail tends to resist stick-slip but, when the friction is overcome and the lateral movement of the wheel relative on the flat top surface of the rail occurs, energy is released as a high pitched noise and the process then starts over again. This rapidly oscillating wheel-rail contact force can excite vibration of the central portion of the wheel which then radiates a high pitch squeal. This, plus the mass of a steel wheel which imparts high forces with high angular acceleration tends to limit service life, pose a danger from breakage and contribute to noise pollution.

SUMMARY OF THE INVENTION

The combination roller coaster wheel of the present invention includes a lightweight alloy wheel body circumscribed by a hard tread ring, the interfaces between the two being machined for a close fit and the ring being thermally shrink fit on the body.

BRIEF DESCRIPTION OF THE DRAWINGS

FIG. 8 is a detailed sectional view taken from the oval number 8 in FIG. 7, in enlarged scale;

FIG. 9 is a diametrical sectional view similar to FIG. 7 but showing the wheel body and tread ring being pressed axially together;

FIG. 10 is a diametrical sectional view of the combination roller coaster wheel shown in FIG. 8 returned to atmospheric temperatures.

DETAILED DESCRIPTION OF THE PREFERRED EMBODIMENTS

Figure 1:
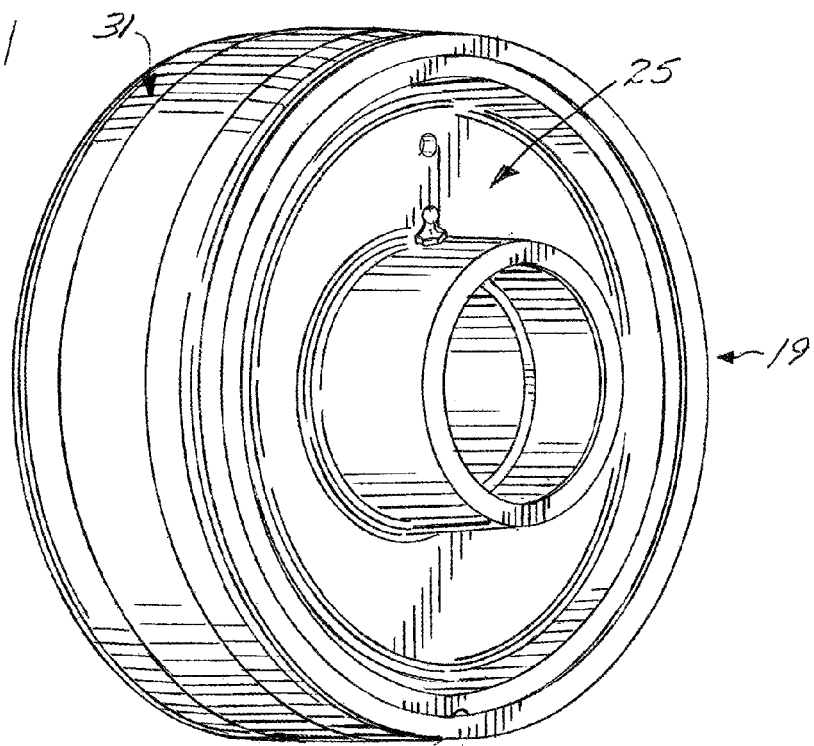
FIG. 1 is a perspective view of a combination roller coaster wheel including a lightweight wheel body circumscribed by a hard metal tread ring embodying the present invention.
Figure 2:
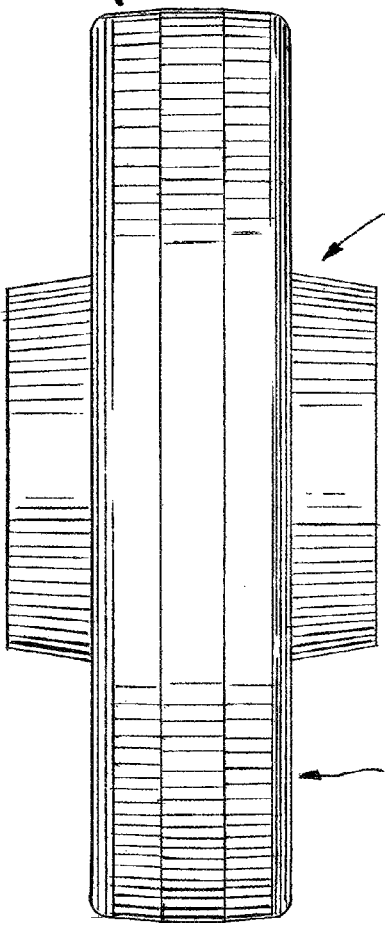
FIG. 2 is a elevation side view thereof.
Figure 3:
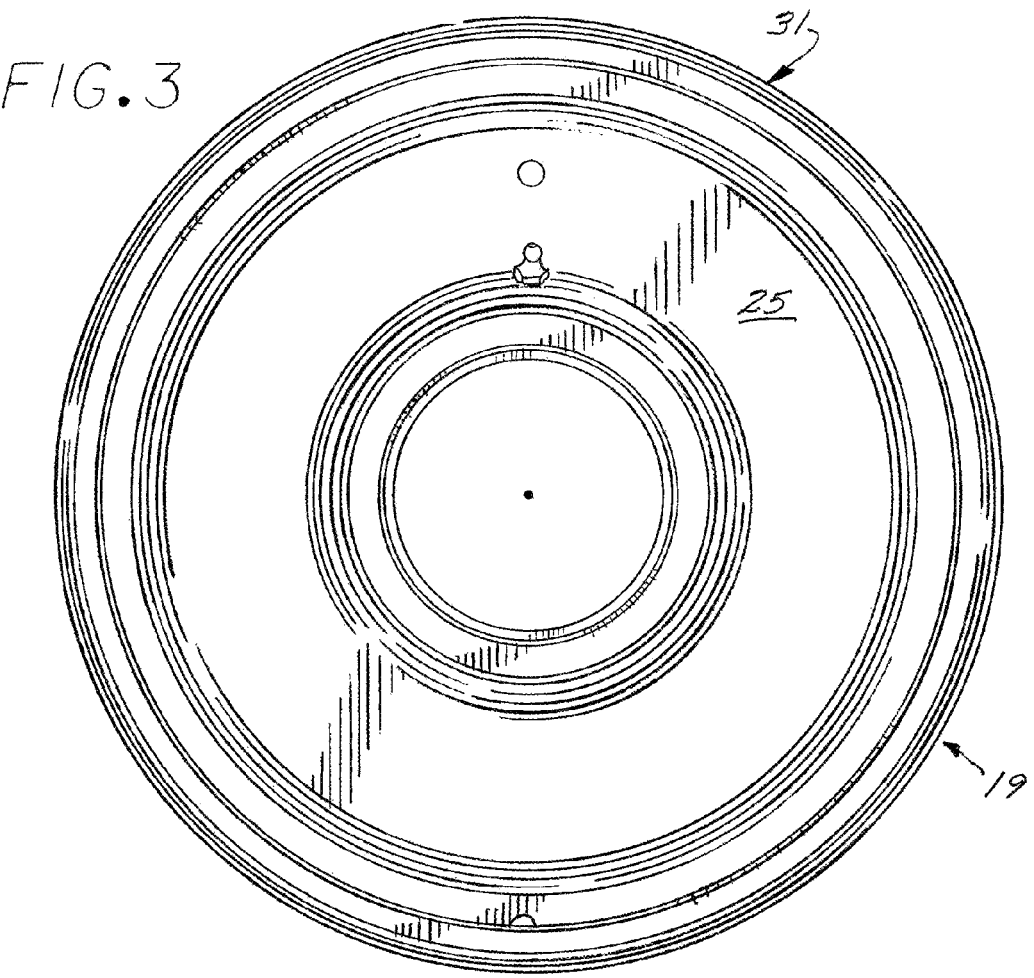
FIG. 3 is an end view, in enlarged scale.
Figure 7:
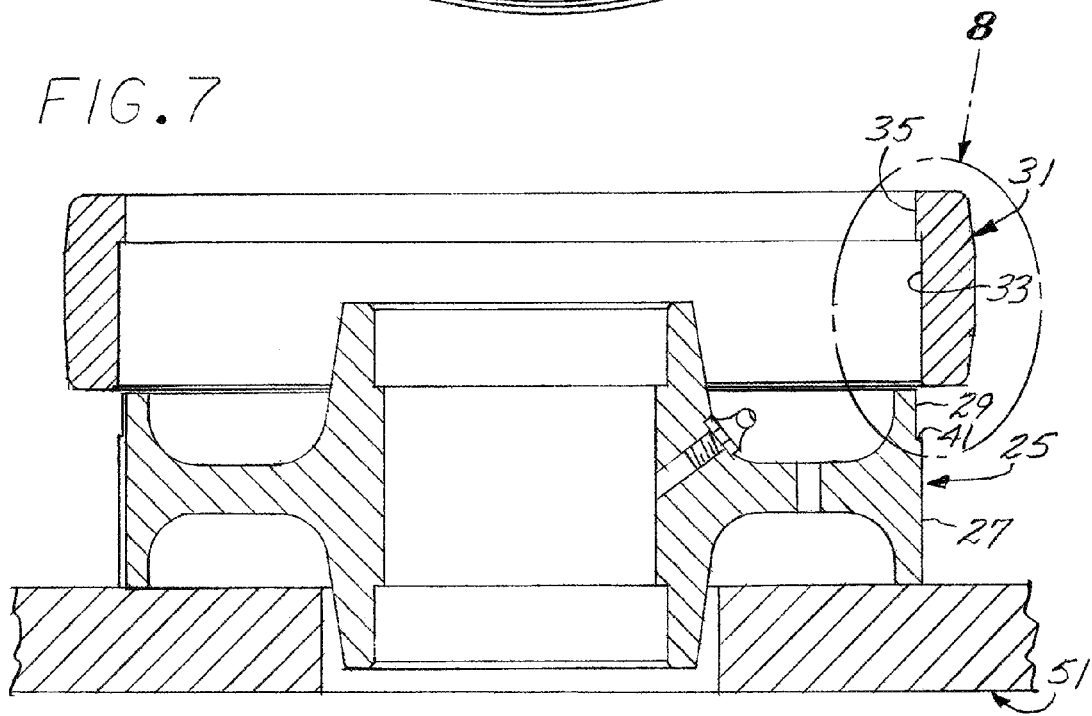
FIG. 7 is a diametrical sectional view of a wheel body and tread ring with the tread ring heated and the wheel body frozen for joining.
Figure 11:
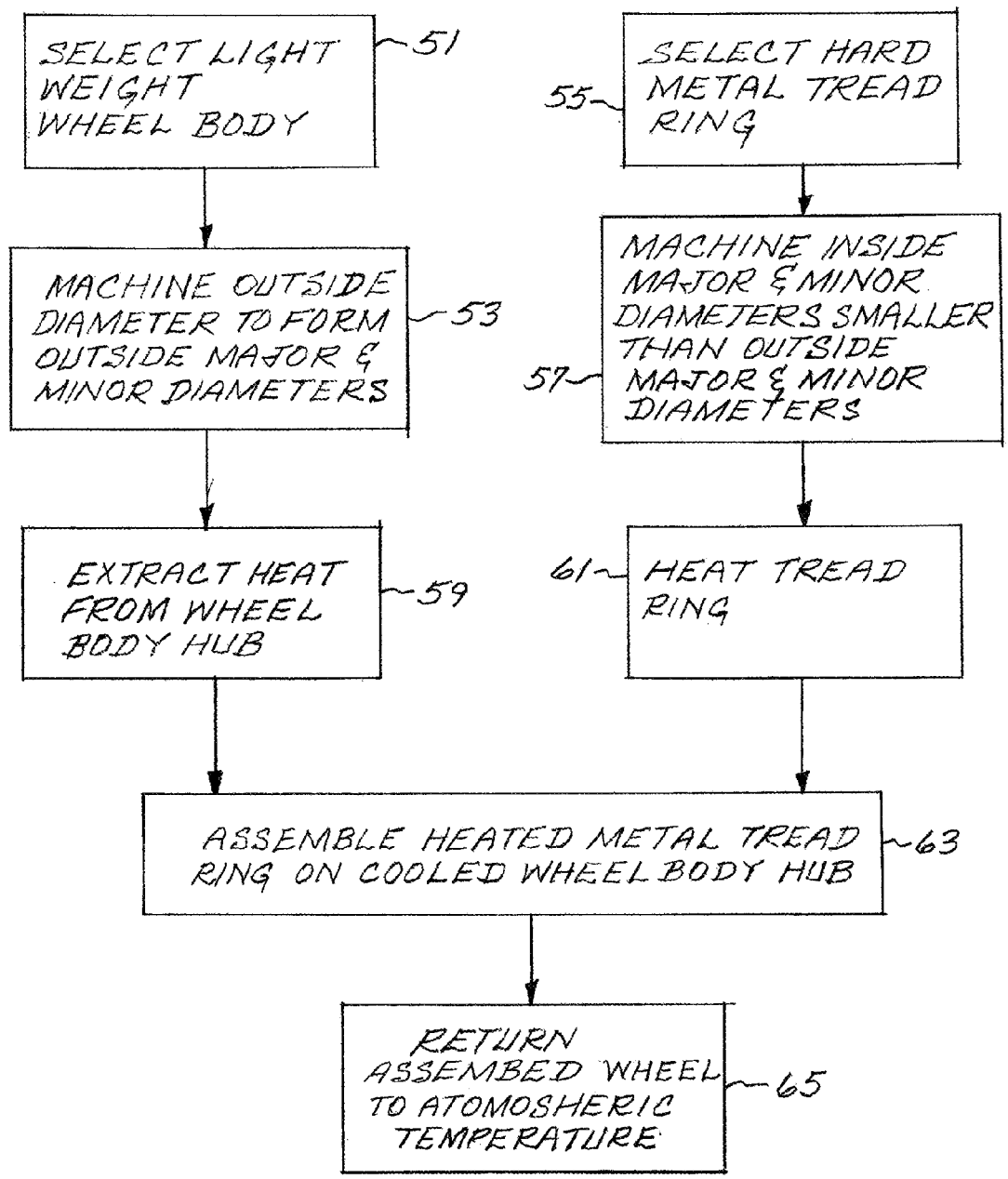
FIG. 11 is a flow chart showing a method of making the roller coaster wheel depicted in FIG. 1.

Referring to FIGS. 1, 7 and 11, the method of the present invention involves selection 51 of a wheel body 25 constructed of a lightweight wheel such as an aluminum alloy or urethane, machining 53 the periphery with the major predetermined diameter to provide a tread bearing disk 27 and machining along one axial side thereof a minor predetermined diameter to form an open side annular stop notch 29. An endless tread ring 31 is selected 55 of wear resistant material such as a carbon steel alloy and machined 57 on its interior to form a tread rim 33 having a major diameter which is, at atmospheric temperature, smaller than the major predetermined diameter of the disk 47 and machining at one side with a minor diameter forming a reduced in diameter stop flange 35 to be received in the stop notch 29. In the preferred embodiment the wheel body 25 is subjected coolant such as for example a cryogen; dry ice or the like to extract heat 59 and shrink the diameter thereof and the tread ring 31 is heated 61 to expand the diameter thereof so that the ring can be pressed 63 onto the wheel body and held in place as shown in FIG. 9 while the components return to atmospheric temperature 65 and the corresponding diameters to form a shrink fit stress bond at the interface.

Steel roller coaster wheels are relatively expensive to manufacture and are lacking in ductility thus being particularly vulnerable to fatigue and failure resulting from the high impact loads and repetitive rapid acceleration loads attendant use, particularly of the guide wheels of the roller coaster. On the other hand, more ductile metal such as aluminum, fails to provide resistance to wear resulting from rolling and skidding contact with the roller coaster track throughout what can sometimes be thousands of feet of travel during each ride, which may be repeated six to twenty or more times every hour for twelve hours per day during times of heavy use. Thus, the labor and material costs for replacement and repair of roller coaster wheels is a major part of the cost of operating a roller coaster. It is this problem to which the present invention is directed.

The wheel body 25 may be constructed of any lightweight material such as urethane or one of various aluminum alloys well-known to those skilled in the art and may exhibit some degree of ductility to absorb shock loads. For my preferred embodiment I have selected an aluminum alloy.

To provide for relatively inexpensive assembly and a high integrity joint between the wheel 25 and ring 31, it is desirable to provide shrink-fitting of the endless ring 31 onto the wheel body to provide for a strained and strong joint between the two.

The wheel may be constructed, for instance, a relatively ductile aluminum alloy. The periphery of the wheel body will then be machined to a predetermined major diameter to provide the tread support disk 27 and a minor diameter at 29 to provide the annular notch having an axially facing stop shoulder 41 to engage the flange 35. As will be appreciated by those skilled in the art, the axial indexing function may be achieved by any one of a number of abutment configurations such as a frusto conical configuration for the interface between the tread ring and wheel body such that when the cooperating conical surfaces seat against each other the ring is properly indexed axially relative to the body.

Figure 4:
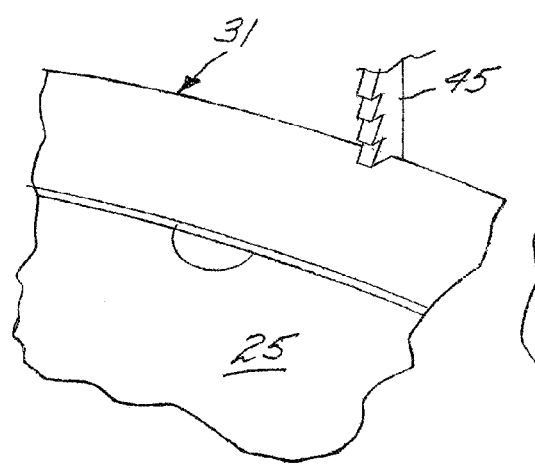
FIG. 4 is a detailed sectional perspective view depicting the tread ring being cut from the wheel body.
Figure 5:
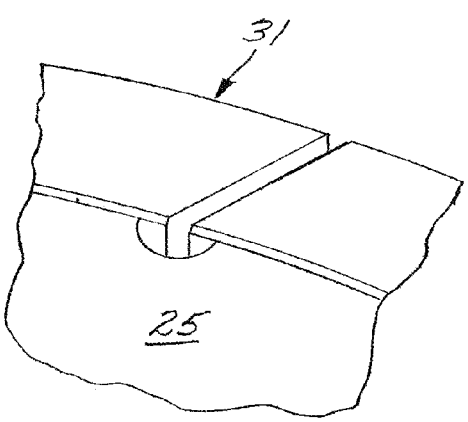
FIG. 5 is a detailed sectional view similar to FIG. 4 but showing the tread ring severed.

In a preferred embodiment, an axial extending radially outwardly opening clearance groove 43 is formed in the rim 27 and notch 29 to provide for clearance of a cutting tool 45 (FIG. 4) to facilitate severance of the ring for replacement purposes.

The tread ring 31 may be constructed of, for instance, a carbon steel alloy 4140 to provide a sturdy, load carrying tread ring contacting the rail and exhibiting resistance to the wear as will be experienced from rolling and skidding contact with the underlying roller coaster track. The ring 31 is machined on its interior to provide an inside diameter for the rim 33 having a diameter at room temperature, smaller than the room temperature diameter of the disk 27 and to likewise provide the inside diameter of the flange 35 with a diameter smaller than the outside diameter of the annular notch 29. In some instances, only one or the other of the diameters of the rim 33 or flange 35 are smaller at room temperature than the corresponding diameters of the wheel.

Once the wheel body and tread ring have been machined, the wheel body 25 may be chilled 59 as by application dry ice liquid nitrogen or one of the other cryogens to substantially reduce the temperature below atmospheric temperature to thereby shrink the diameter of the wheel body. Concurrently, or alternatively, the tread ring 31 may be heated 61 as by oven heating or induction heating or the like to expand the diameter thereof so that the inner diameter of the rim and flange 33 and 35, respectively are larger than the diameters of the disk 27 and notch 29 to thereby allow for telescopical fitting of the ring axially onto the wheel body 25 as shown in FIGS. 7 and 9. With the components aligned axially the press platen 53 may be lowered to press 63 the ring axially onto the body until the annular shoulder of the flange 35 abuts the confronting annular shoulder 41 of the notch 29 to exactly center the ring on the body of the as shown in FIGS. 8 and 9 and hold the components together while they return to atmospheric temperature 65 so the ring will shrink onto the circumference of the expanding wheel body. As will be appreciated by those skilled in the art, the high stresses generated by the resultant thermal lock will thus be evenly distributed over the axial extent of the interface for even loading to maintain the ring centered on the wheel body to thus cooperate in carrying the load and shock during the service life of the wheel. The wheel device 19 may then be removed from the press and is ready for mounting to the axial of a roller coaster car.

Figure 6:
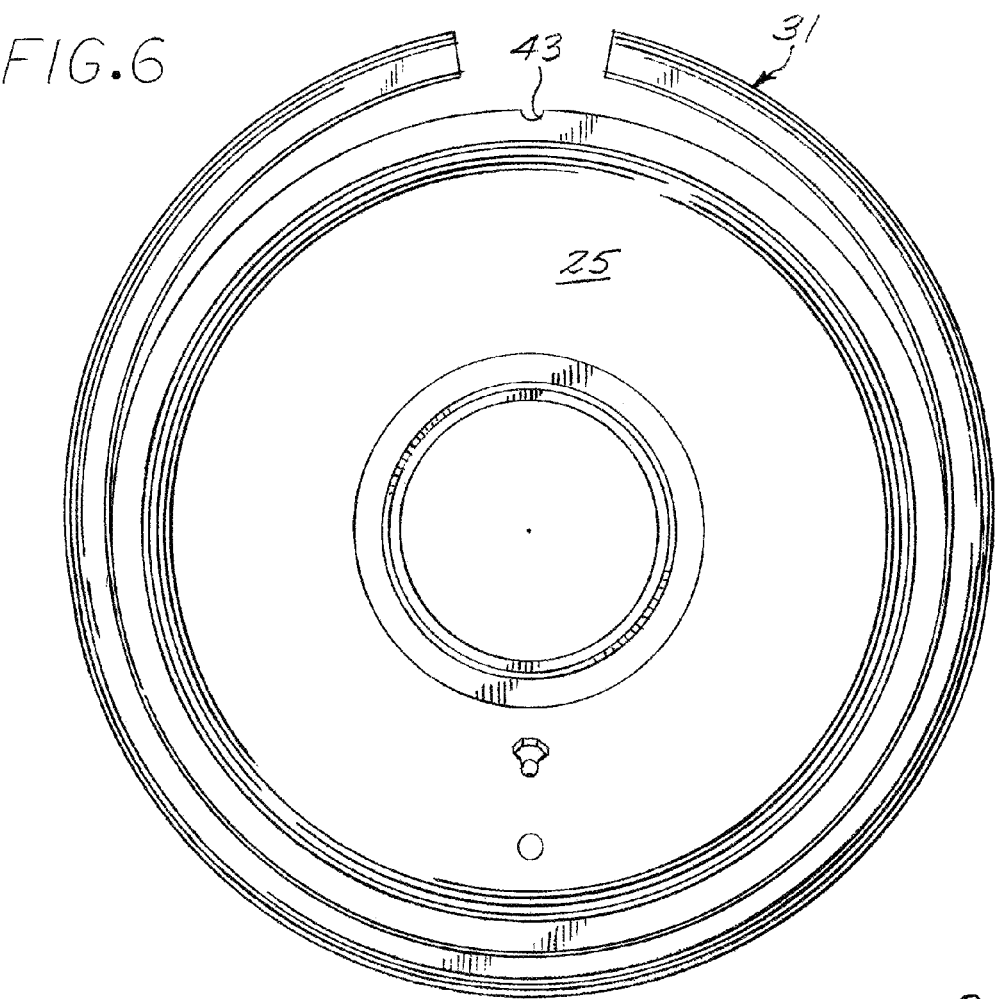
FIG. 6 is a end view similar to FIG. 3 but showing the severed tread ring being separated.

Through empirical testing it has been proven that the combination roller coaster wheel 19 has a service life extending well beyond that of conventional steel or aluminum roller coaster wheels. In any event, after long usage, the ring will become worn thus requiring replacement. Such ring may easily be removed from the wheel body 25 by severing the ring along the axial line of the clearance groove 43 (FIGS. 6 and 7) so that ring may be bent away from the periphery of the wheel body as shown in FIG. 6. A new endless ring 31 may then be applied to the wheel body 25 as described above with relation to FIGS. 7-11. The replacement process is efficient, straight forward and provides for a high integrity bond between the replacement ring and wheel body.

For my exemplary embodiment, I have constructed the wheel body of aluminum bar 6061-T6 and the tread ring 31 of 4140Q&T carbon alloy tubing per ASTM A519. I have constructed the outside diameter of the rim ring at 9.00 inches. For the shrink fit, I have constructed the predetermined major diameter for the wheel body 27 at 8.3478 to 8.346 inches and the minor predetermined diameter for the annular stop notch 29 at 8.2570 to 8.258 inches correspondingly, I have constructed the inside diameter of the rim 33 at 8.3300 to 8.3320 inches and the inside diameter of the flange 35 from 8.2500 to 8.2518 inches. I have discovered by making the inside diameter of the tread ring 31 approximately 0.182% smaller than that of the outside diameter of the wheel body at atmospheric temperature I provide the satisfactory stress bond for the roller coaster wheels.

As will be appreciated by those skilled in the art other lightweight materials might be used for the wheel body and many other wear resistant metals will serve the purpose of the tread ring shrunk fit onto the body, it only being important that the body be lightweight and the ring of a hard metal and that the stress bond between the two be strong and resistant to shock and repetitive flex.

In operation, it will be appreciated that, for example, when the combination wheel 19 of the present invention is utilized as a guide wheel for roller coasters, and the non-rotating wheel is carried at high velocity into engagement with a guide rail, it will subject the surface of the tread ring 31 into what is first skidding contact, and then rotating contact to initiate rotation thereof to thereby provide high angular acceleration as the surface of the ring skids along the rail and is brought up to speed rotating at high rpm's. It will be appreciated that the steel ring 31 will resist wear from the skidding contact as well as any abrasive effect resulting from dirt or grit on the side rail. More importantly, it will be appreciated that even as the wheel body is subjected to high angular acceleration its relatively low density aluminum mass will minimize the resultant angular momentum thus minimizing the consequent stress to thus minimize the resultant rate of fatigue for the metal. Also, it is believed that the level of noise emitted from the vibration of the body of the wheel during creep skid is reduced from what would be emitted from a steel body of comparable size and shape.

Similarly, for the load bearing roller coaster wheels, the wheels 19 will operate in carrying the load of the roller coaster train as it travels along thousands of feet of rail often carrying up to twenty passengers or even more subjecting the wheel to high loads as it maneuvers along the undulations and slopes in the track, around curves and contacts with irregularities and undulations in the rail thus subjecting the ring 31 and wheel body 25 to shock loads, loads which will tend to be somewhat dissipated in the ductile characteristics of the wheel body which will tend to absorb a certain amount of shock between the ring and axle of the roller coaster. This tends to reduce the rate at which wheels are fatigued and prolongs the life over what would be the case for a integral steel wheel. Of even greater importance is that the subject wheels, being of much lighter weight than steel wheels, serve to reduce the weight of the overall roller coaster train and consequent magnitude of weight and attendant shock forces applied during travel over undulating tracks at high rates of speed.

As will be appreciated by those skilled in the art, the combination roller coaster wheel of the present invention provides a significant reduction in weight for a roller coasters trains, a factor of significant importance for a train requiring some 80 to 100 to thereby reduce the wear and tear on the roller coaster tracks. The combination wheel provides the benefits of a lightweight aluminum which is a less efficient transmitter of high frequency sound than steel and renders the task of changing wheels much more convenient with less risk of physical injury to the workman by repeatedly lifting comparatively heavy steel wheels. Such wheels with diameter of 6 to 9 inches have proven far superior to prior art roller coaster wheels exhibiting a long service free life.

It will thus be appreciated that the combination roller coaster wheel of the present invention substantially reduces the weight of a multiple car roller coaster train, reduces the strain from rapid angular acceleration of the wheel, absorbs shock, and resists denting and wear while minimizing emission of squeal noises from creep.

I claim:

1. A method of making a combination roller coaster wheel including:
    selecting a one piece aluminum alloy wheel body;
    machining the outside of the wheel body to, at atmospheric temperatures, provide predetermined major and minor diameters forming a support disk of the predetermined major diameter and forming along one axial edge of the support disk an annular stop notch of the predetermined minor diameter and further forming a single stop shoulder facing in one axial direction;
    selecting a carbon steel tread ring;
    machining the inside surface of the tread ring to provide, at atmospheric temperatures, an annular rim having an inside major diameter sufficiently smaller than the predetermined major diameter and a reduced-in-diameter stop flange of a minor inside diameter sufficiently smaller than the predetermined minor diameter to, at atmospheric temperatures, lock the ring to the wheel body and to further form an annular axially facing surface;
    applying heat to the ring to expand the ring sufficiently to render the inside major and inside minor diameters of the ring larger than the major and minor outside diameters of the wheel to establish an annular clearance between the wheel body and ring; and
    while maintaining the clearance, fitting the tread ring axially onto the wheel body to abut the axially facing surface against the stop shoulder;
    returning the wheel body and ring to atmospheric temperature to shrink fit the tread ring onto the wheel body to mechanically lock the ring to the wheel body.

2. The method as set forth in claim 1 that wherein:
    the steps of machining the outside diameter of the wheel body and inside surface of the tread ring includes machining such diameters to construct the inside diameter of the ring substantially 0.182% smaller than that of the outside diameter of the wheel at atmospheric temperatures.

3. The method of making a combination roller coaster wheel as set forth in claim 1 wherein:
    the machining of the wheel body includes forming an axially extending clearance groove to open radially outwardly from the wheel body toward the ring for clearance of the saw teeth in the event the ring is to be sawed through for removal.

4. A method of making a combination roller coaster wheel including:

selecting a one piece aluminum alloy wheel body;
machining the outside of the wheel body to, at atmospheric temperatures, provide a predetermined diameter and an annular stop notch forming a single stop shoulder facing in one axial direction and even further machining an axial clearance groove in the major diameter for clearance of saw teeth;
selecting a tread ring of a material having a positive coefficient of thermal expansion and harder than the aluminum body;
machining the inside surface of the tread ring to provide, at atmospheric temperatures, a machined inside diameter defining an annular rim having an inside diameter sufficiently smaller than the predetermined diameter to, at atmospheric temperature lock on the predetermined diameter and further forming an annular surface to, when the ring is mounted to the wheel body, abut the stop shoulder,
applying sufficient heat to the ring to expand the ring and removing sufficient heat from the wheel body to shrink the wheel body sufficiently to render the inside diameter of the ring larger than the predetermined diameter of the wheel body to establish an annular clearance between the wheel body and ring;
while maintaining the clearance, fitting the tread ring axially onto the wheel body to abut the flange against the stop shoulder; and
returning the wheel body and ring to atmospheric temperature to shrink fit the tread ring onto the wheel body to lock the ring to the wheel body.

5. A method of making a combination roller coaster wheel including:
selecting a one piece aluminum alloy wheel body;
machining the outside of the wheel body to, at atmospheric temperatures, provide predetermined major and minor diameters forming a support disk of the predetermined major diameter and forming along one axial edge of the support disk an annular stop notch of the predetermined minor diameter and further forming a single stop shoulder facing in one axial direction;
selecting a tread ring having a positive coefficient of thermal expansion and of a material harder than aluminum;
machining the inside surface of the tread ring to provide, at atmospheric temperatures, a machined inside diameter defining an annular rim having an inside major diameter smaller than the predetermined major diameter and a reduced-in-diameter stop flange of a diameter smaller than the predetermined minor diameter and to form an annular surface to, when the ring is mounted to the wheel body, abut the stop shoulder, the inside diameters being sufficiently smaller than the respective major and minor diameters to cause the rim to, when contacted on the respective major and minor diameters at atmospheric pressure, lock the ring to the wheel body;
applying sufficient heat to the ring or removing sufficient heat from the wheel body to render the inside major and minor diameters of the ring larger than the major and minor outside diameters of the wheel to establish an annular clearance between the wheel body and ring;
while maintaining the clearance, fitting the tread ring axially onto the wheel body to abut the flange against the stop shoulder; and
returning the wheel body and ring to atmospheric temperature to lock the tread ring onto the wheel body to mechanically lock the ring or the wheel body.

\* \* \* \* \*